United States Patent Office 3,475,082
Patented Oct. 28, 1969

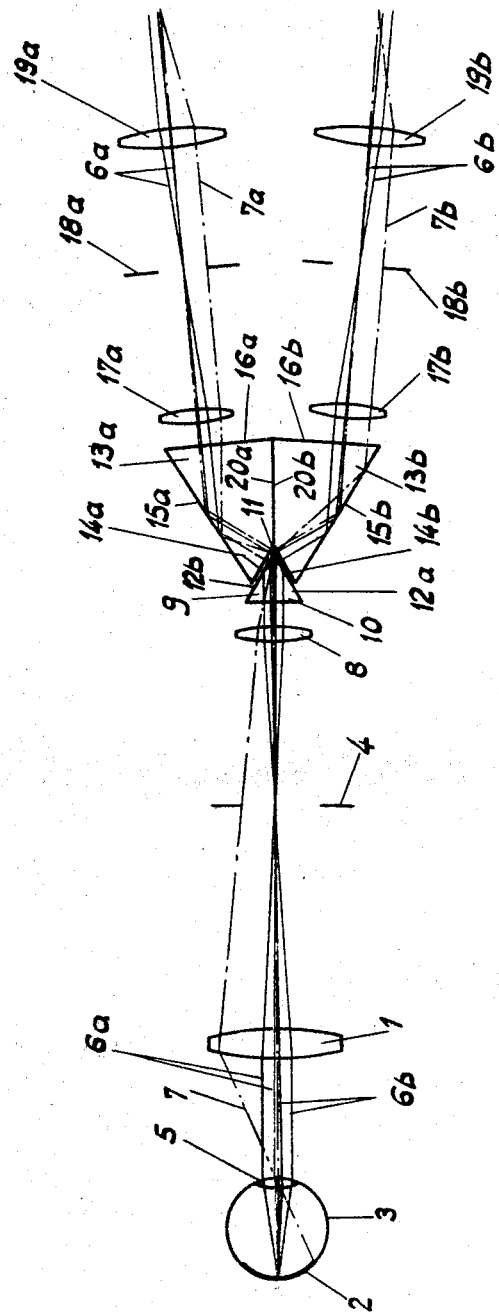

3,475,082
STEREO FUNDUSCOPE
Waldemar Strietzel, St. Gall, Switzerland, assignor to FISBA, Optische Prazisions-Instruments AG., St. Gall, Switzerland
Filed Apr. 25, 1967, Ser. No. 633,596
Claims priority, application Switzerland, May 3, 1966, 6,384/66
Int. Cl. A61b 3/10; G02b 27/02
U.S. Cl. 351—6                                            2 Claims

ABSTRACT OF THE DISCLOSURE

A stereo funduscope or ophthalmoscope for examining the retina of the eye. A separating prism divides image rays received from a single objective lens into two groups, each group of rays passing to a separate eyepiece. Between the separating prism and each eyepiece is a reflecting surface or prism. A reversing lens system in the funduscope forms a properly oriented image at the eyepieces.

SUMMARY OF THE INVENTION

The present invention is directed to an instrument for examining eyes and, more particularly, to a stereo funduscope or ophthalmoscope for examining the retina of the eye.

A funduscope is an instrument for examining the fundus oculi or concave interior of the sye consisting of the retina, the choroid, the sclera, the optic dish and blood vessels. For purposes of this description, it will be referred to as an instrument for examining the retina.

Stereo funduscopes have been known in the art, however, previously they have been formed by two separate microscopes, one for each eye of the observer. Such instruments have the disadvantage that only a small portion of the retaina can be observed at one time, for examination of another portion of the retina the funduscope must be readjusted. This problem arises because the eyepieces of each microscope must coincide with the pupil of the eye and the angle of vision is determined by the diameter of the objective lens. However, because the objective lens for each microscope must lie side-by-side with the other, the diameter of the objective lens is limited in size.

In the present invention by utilizing a single objective lens this disadvantage of a small field of vision in known funduscopes is overcome.

Accordingly, the stereo funduscope of this invention is characterized by the single objective lens and a separating prism disposed between it and a pair of eyepieces. The prism separates the image rays into two diverging halves supplying one-half to each of the eyepieces by means of a reflecting surface. It should be noted that it has been known to use stereomicroscopes in which image rays are supplied to binocular-type eyepieces through a single or common objective lens.

In such stereomicroscopes, however, the objects viewed are located not only geometrically but also optically in the vicinity of the objective lens. On the contrary in a funduscope the image rays originating from the retina are directed in parallel relationship by the eye lens and therefore the object being observed lies, considered optically, in infinity before the objective lens. For this reason, the division of the day path into two halves cannot be effected in the relatively simple manner customary in known stereomicroscopes.

BRIEF DESCRIPTION OF THE DRAWING

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

In the drawing:

The single figure of the drawing illustrates an embodiment of the invention schematically in plan.

DESCRIPTION OF THE PREFERRED EMBODIMENT

The stereo funduscope has an objective lens 1 which, when observing the retina 2 of the eye 3, reproduces the retina in a plane containing a field stop 4.

In the drawing, the image ray path of the central point of the retina 2 is represented, in solid lines, by two rays 6a, 6b which pass through the pupil 5 of the Eye, as viewed by the observer, one lying in the right-hand half and the other in the left-hand half of the pupil. In addition, the main ray 7 representing a beam of rays reproducing a peripheral point on the retina is shown in dash-dot lines. The rays 6a, 6b are directed in parallel relationship by the lens or pupil of the eye 3, which is assumed to have normal vision, to the objective lens 1. The objective lens or objective then combines the rays 6a, 6b in its focal point lying in the field stop plane. From the field stop plane the rays diverge and pass through the lens 8 which again forms them in parallel as they proceed into a separating prism 9.

The separating prism 9 is of triangular cross section when viewed in plan and is symmetrically arranged on the optical axis of the funduscope. The base or entrance face 10 of the prism is positioned normal to the optical axis and is directed toward the objective lens 1. Opposite the entrance face 10, the apex or edge 11 of the prism is directed away from the objective lens and lies on the optical axis. The edge 11 is located in the plane in which the entrance pupil of the funduscope coincides with the pupil 5 of the eye and is reproduced by the objective lens 1 and lens 8. The sides or faces of the prism are surrounded by air and spaced from the adjacent surfaces. In the prism 9, rays 6a, 6b are totally reflected by symmetrical faces 12a, 12b and issue perpendicularly through the oppositely disposed symmetrical faces 12b, 12a, respectively.

From the separating prism 9 the rays 6a pass into a reflecting prism 13a of generally rhomboid cross section as shown in the drawing. Entrance face 14a of the reflecting prism 13a is spaced from and disposed parallel to face 12b of the separating prism 9. The rays 6a are totally reflected by a face 15a of the prism 13a in a direction diverging from the optical axis and then pass through an exit face 16a into a lens 17a, whose focal point lies in the plane of an eyepiece stop 18a. In this plane, the intermediate image of the retina 2 situated in the field stop plane is reproduced again non-reversed laterally and vertically by the lenses 8 and 17a forming a reversing lens system. Accordingly, the retina image from the plane of the eyepiece stop is offered to the observer's right eye through eyepiece 19a. In the same manner, rays 6b pass from the separating prism 9 through eyepiece 19b to the left edge of the observer, the respective elements of the funduscope marked with the same reference numeral and the suffix letter b.

In the drawing, faces 20a and 20b of the prisms 13a and 13b are shown cemented together and located on the optical axis. However, as is apparent from the function of the prisms 13a, 13b a single prism or two mirrors positioned as the faces 15a, 15b, respectively, could provide the same result.

The main ray 7 of the image ray beam from the peripheral retina point meets the optical axis coincident with the apex or separating edge of prism 9, because the main ray passes through the center of the eye and pupil 5, its image lies in the plane passing through the separating edge 11. The image rays of the peripheral retina point disposed to the right and left of main ray 7, which in the separating prism again extend in parallel relationship to each other and are separated in the same manner as the rays 6a and 6b, as illustrated by the prolongations 7a and 7b of the main ray 7. The same is true for the reproduction of every point on the retina 2, accordingly, the observer is offered stereoscopically two laterally and vertically non-reversed images of the retina.

For the proper observation of the retina 2, the distance of the objective lens 1 from the pupil 5 of the eye must be fixed by spacers (not shown) resting against the forehead of the person whose eye is being examined so that the image of the pupil 5 actually lies in the plane of the separating edge. If the eye being examined does not have normal vision then the objective 1 must be displaced to assure that the intermediate image of the retina 2 lies in the plane of the field stop 4 and the image of the pupil 5 is located in the plane of the separating edge 11. To illuminate the retina 2 known means may be used, such as a mirror (not shown) positioned in front of the objective lens 1 and inclined to the optical axis at an angle of 45° for casting rays from a light source through the pupil 5 of the eye onto the retina 2.

In a funduscope of the type described, the diameter of the objective lens 1 may be of a size necessary to attain the desired light intensity and a field of vision which represents a large section of the retina 2. Naturally, the angle of inclination of the axes of the eyepieces 19a, 19b relative to each other may be fixed as desired in accordance with the need of the practice.

What is claimed is:

1. A stereo funduscope having an optical axis and adapted to observe the retina of the eye and comprising an objective lens adapted to be positioned at a fixed distance from the pupil of the eye to be examined, a second lens aligned on the opposite side of said objective lens from the entrance pupil, a field stop located between said objective lens and said second lens and disposed in a plane in which said objective lens reproduces the retina, the image rays directed in parallel relationship from the entrance pupil to said objective lens being disposed in converging relationship by said objective lens until they are combined at the plane of said field stop from which the image rays diverge to said second lens which again forms the rays in parallel relationship, a right and a left eyepiece spaced on the opposite sides of said second lens from said objective lens and located at the site of the exit pupil of the funduscope, a separating prism disposed on the optical axis between said second lens and said eyepieces, said prism having a triangular cross-section with the base thereof facing toward said objective lens and being disposed normally to the optical axis and the apex being directed toward said eyepieces and located on the optical axis for separating the image rays passing through said objective lens and directing one-half of the image rays to each of said eyepieces, the triangular cross-section of said prism having a pair of converging symmetrical sides extending from the base to the apex thereof, a pair of opposed reflecting means situated on opposite sides of the optical axis, each of said reflecting means spaced from one of said converging sides of said prism for reflecting image rays directed from said separating prism through the converging side thereof into one of said eyepieces, and a third lens located between said reflecting means and said eyepieces, said second and third lenses forming a lens system for reversing the image within the funduscope whereby the image rays entering the right side of said objective lens are directed to said right eyepiece and those entering the left side are directed to said left eyepiece.

2. A stereo funduscope as set forth in claim 1, wherein each of said reflecting means comprises a reflecting prism positioned between said separating prism and one of said eyepieces, said reflecting prism having an entrance face located in spaced parallel relationship with one of the converging faces of said separating prism for passing image rays received therefrom to a totally reflecting face which, in turn, directs the image rays through an exit face of said reflecting prism to the corresponding said eyepiece.

References Cited
UNITED STATES PATENTS

| | | | |
|---|---|---|---|
| 678,848 | 7/1901 | Kroulik | 350—53 X |
| 1,547,182 | 7/1925 | Pulfrich | 350—145 X |
| 3,290,927 | 12/1966 | Gambs. | |

DAVID SCHONBERG, Primary Examiner

PAUL A. SACHER, Assistant Examiner

U.S. Cl. X.R.

350—35, 145